(12) United States Patent
Huras et al.

(10) Patent No.: US 6,950,834 B2
(45) Date of Patent: Sep. 27, 2005

(54) ONLINE DATABASE TABLE REORGANIZATION

(75) Inventors: Matthew A. Huras, Ajax (CA); Nelson Hop Hing, Scarborough (CA); Jeffrey J. Goss, Toronto (CA); Bruce G. Lindsay, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 09/774,202

(22) Filed: Jan. 29, 2001

(65) Prior Publication Data

US 2001/0047360 A1 Nov. 29, 2001

(30) Foreign Application Priority Data

Mar. 29, 2000 (CA) ............................................. 2302981

(51) Int. Cl.[7] .............................................. G06F 17/30
(52) U.S. Cl. ............................... 707/202; 707/2; 707/8; 707/10; 707/102; 348/708; 712/2; 712/300
(58) Field of Search ........................ 707/2, 8, 10, 101, 707/102, 103 R, 104.1, 204, 200, 202; 345/559, 600; 348/708; 358/444; 382/305; 712/2, 300; 700/1, 100, 101

(56) References Cited

U.S. PATENT DOCUMENTS

| | | | | |
|---|---|---|---|---|
| 5,222,235 A | * | 6/1993 | Hintz et al. | 707/101 |
| 5,517,641 A | * | 5/1996 | Barry et al. | 707/101 |
| 5,721,915 A | * | 2/1998 | Sockut et al. | 707/200 |
| 5,724,581 A | * | 3/1998 | Kozakura | 707/202 |
| 5,758,357 A | * | 5/1998 | Barry et al. | 707/202 |
| 5,887,274 A | * | 3/1999 | Barry et al. | 707/202 |
| 5,933,820 A | * | 8/1999 | Beier et al. | 707/1 |
| 6,397,227 B1 | * | 5/2002 | Klein et al. | 707/200 |
| 2002/0059293 A1 | * | 5/2002 | Hirsch | 707/103 R |

* cited by examiner

*Primary Examiner*—Shahid Al Alam
(74) *Attorney, Agent, or Firm*—Sawyer Law Group LLP

(57) ABSTRACT

A database table reorganization is defined to permit online access of the table during the reorganization. Records are reorganized in the database table by vacating records from a defined number of pages and then filling the pages with records in accordance with a desired ordering for the records. Temporary pointers to the new locations of moved records are used to prevent table scanner access to the database table from missing or duplicating records while scanning the database table during reorganization. Removal of the temporary pointers is synchronized with the completion of scanning of all table scanners that are commenced during a time when records are being moved as part of a vacating or filling step.

49 Claims, 5 Drawing Sheets

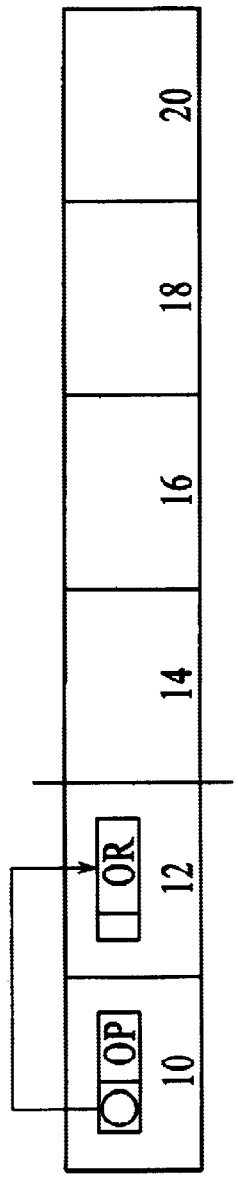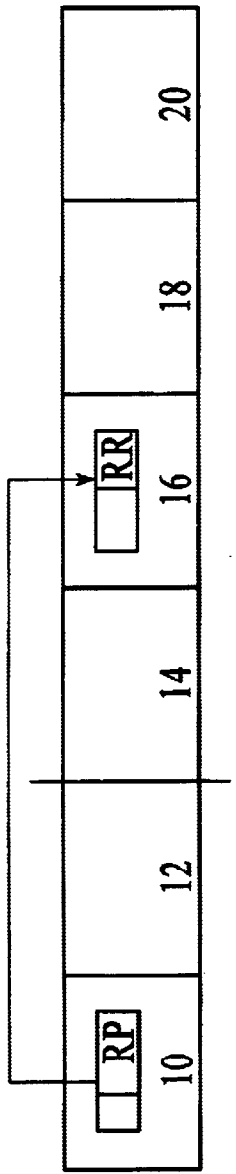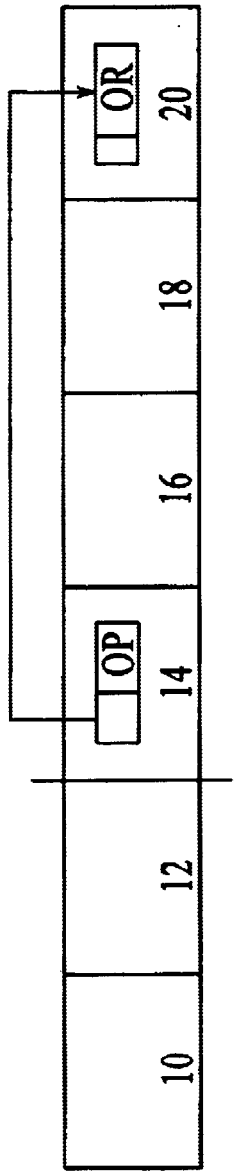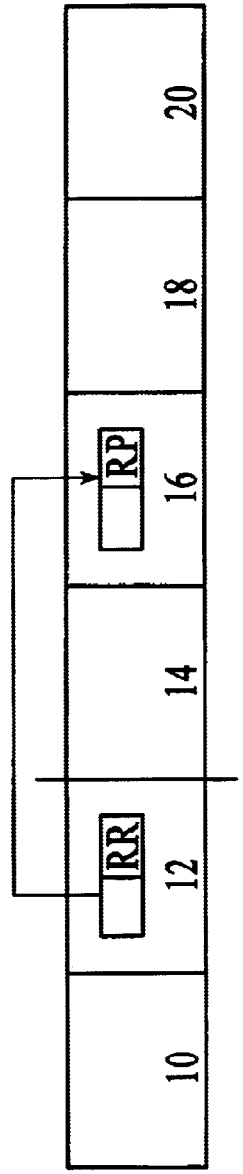

ONLINE DATABASE TABLE REORGANIZATION

CROSS REFERENCE TO RELATED APPLICATIONS

This application claims benefit under 35 USC 119 of Canadian Application No. 2,302,981, filed on Mar. 29, 2000.

FIELD OF THE INVENTION

The present invention is directed to an improvement in computing systems and in particular to the online reorganization of database tables.

BACKGROUND OF THE INVENTION

In relational database management systems (relational DBMSs) data is stored in tables that have rows (records) and columns (fields or attributes). As data is added, deleted and modified in a relational database table, prior art DBMSs provide the user with the ability to rebuild the table. The reorganization or rebuilding of a table is desirable to permit the table to be efficiently accessed and updated by the relational DBMS. Reasons to reorganize a database table include improved clustering of data, reduction of pointers within the table, and improved distribution of free space in the table.

In prior art relational DBMSs, it is possible to reorganize a table offline. In its most simple form, users are denied access to the table during a potentially significant time while the table is being reorganized. This denial of access to the table is a significant cost to the long-term benefit of reorganizing the table.

A more sophisticated approach to table reorganization is to generate a shadow table that is a copy of the original table, reorganized for efficient accessing and updating. According to this prior art approach records are read from the original table and written to a new, shadow, table in a manner defined to provide a more efficiently organized shadow table. When the records have all been copied from the original table to the shadow table, the original table is replaced by the shadow table. An example of such an approach is set out in U.S. Pat. No. 5,721,915 (Sockut).

This prior art approach to database table reorganization requires significant data storage capability in the system of the DBMS as the data in the table is effectively duplicated during the building of the shadow table. The data in the table is also unavailable to users during the time that the original table is being replaced by the shadow table. A further shortcoming of this prior art approach is that the benefits of the reorganization of the data are not available to the user of the database table until the shadow table has replaced the original table.

Other prior art approaches involve the online reorganization of database tables. Zou, C. and Salzberg, B. describe certain online approaches in "Safely and Efficiently Updating References During On-Line Reorganization," Proceedings of the 24th VLDB Conference, New York, U.S.A., 1998. In that paper, the reorganization of a database table is described in which records are moved in the database table, and indexes are updated while users are able to continue to access the database. In the Zou and Salzberg approach, locking protocols for table scanners are described. One locking solution described is to follow the level 3 consistency or repeatable read whereby all locks are kept until the end of a transaction and scanners lock with page or greater granularity (a scanner is a process which reads from an index or a data table, as is described in more detail below). A second approach outlined is to have each scanner lock on a latch which will prevent the reorganization from being carried out until the scanner releases the lock. However, such locking protocols significantly restrict the access to the database during the reorganization. Other algorithms are referred to in the Zou and Salzberg paper but those algorithms do not address the issues of concurrent reorganization and user access in a manner which is thought to be satisfactory for significant collections of data.

It is therefore desirable to reorganize relational tables so that the DBMS does not require significant data storage space for a shadow table, the table reorganization benefits are incrementally available to the user, and in which the user is able to access the data in the table during the table reorganization without observing significant reduction in performance of the DBMS.

SUMMARY OF THE INVENTION

According to one aspect of the present invention, there is provided an improved system for the reorganization of database tables.

According to another aspect of the present invention, there is provided a program storage device readable by a machine, tangibly embodying a program of instructions executable by the machine to perform method steps for reorganizing a database table online to meet a predefined reorganization criteria, the table having records, the method including the following steps:
a) moving a subset of records within the database table in a move step of the reorganization,
b) flagging each record moved in the move step as a reorganization record and
c) creating a reorganization pointer record for each record moved in the move step at the initial location of the moved record, the reorganization pointer record pointing to the new location of the moved record,
d) identifying table and index scanner processes commencing prior to the completion of the move step as old scanners, whereby old table scanners are constrained to access records in the database table by following reorganization pointers to access reorganization records, and whereby old table scanners are constrained to ignore reorganization records when accessing records sequentially in the scan of the database table,
e) identifying table and index scanner processes commencing after the completion of the move step as new table scanners, whereby new table scanners are constrained to ignore reorganization pointers in accessing records in the database table,
f) synchronizing a clean up step to commence after each move step is complete and after each query associated with an old index or table scanner is complete, the clean up step deleting the reorganization pointer records created during the move step, and removing the reorganization record flag from the records flagged by the move step, and
g) repeating move steps until the records in the database table meet the reorganization criteria, each move step being synchronized to commence after each clean up step is complete and after each query associated with a new table or index scanner is complete.

According to another aspect of the present invention, there is provided the above program storage device in which the method steps are defined such that the move steps alternate between a vacate move step for moving records from a one of successively defined portions of the table, and a fill move step for moving records in a predefined order, defined by a clustering index associated with the table, into a one of the successively defined vacated portions of the table.

According to another aspect of the present invention, there is provided the above program storage device in which the table includes overflow pointer records pointing to overflow records and in which the method steps include steps defining each overflow pointer record in a one of the successively defined portions of the table during a vacate move step to be a reorganization overflow pointer record, and flagging the associated overflow record to be a reorganization record.

According to another aspect of the present invention, there is provided the above program storage device in which the step of synchronizing the clean up step comprises the steps of a process implementing the clean up step requesting and waiting for the exclusive availability of a latch which is shareable by each old table scanner process and each index scanner process and which latch is obtained by each old table scanner process and each index scanner process before commencing scanning and which is released after the query associated with each old table scanner process and with each index scanner process has completed processing.

According to another aspect of the present invention, there is provided the above program storage device in which the method steps further comprise steps to maintain the identity and status of moved records in a record identifier mapping table, and in which record identifier mapping table includes a mapping record corresponding to each of the moved records, each mapping record includes an old record identifier for the initial position of the moved record, a new record identifier for the moved position of the moved record, and a status flag for the moved record, and in which record identifier mapping table includes a hash table implemented having a hash on the new record identifier, and a hash table containing a reverse record identifier mapping.

According to another aspect of the present invention, there is provided the above program storage device in which the method steps include logging steps for retaining data values relating to:
a) the start of each move step,
b) the move of a normal (non-reorganization) record,
c) the move of a pointer record where, during a vacate step, the associated overflow record is not in the vacate range,
d) the move of a pointer record where, during a vacate step, the associated overflow record is in the vacate range,
e) the move of an overflow record during a vacate phase,
f) the successful move of a record,
g) the successful clean up of a row that has been moved, and
h) the completion of the online reorganization,
whereby the table may be rolled back without the loss of data due to the reorganization of the table.

According to another aspect of the present invention, there is provided the above program storage device in which the method steps further include the step of imposing a key value lock where an index scanner is accessing an ordered list of key values in an index associated with the table, the key value lock preventing index values from being updated while the index scanner accesses the ordered list of key values.

According to another aspect of the present invention, there is provided the above program storage device in which the method steps further include the step of synchronizing between scanners by imposing an share lock on records subject to a move step and records subject to a clean up step.

According to another aspect of the present invention, there is provided the above program storage device in which the method steps further include an idle step in which no move step or clean up step is performed.

According to another aspect of the present invention, there is provided a program storage device readable by a machine, tangibly embodying a program of instructions executable by the machine to perform method steps for reorganizing a database table to meet a pre-defined reorganization criteria, the table comprising records stored on pages, the method comprising carrying out a series of pairs of vacate steps and fill steps on a sequentially advancing defined set of pages, until the records in the database table meet a predefined ordering constraint, each vacate step comprising
a) a vacate move step comprising the steps of
  i) moving each data record in the defined set of pages to a new location in a page in the database table outside the defined set of pages,
  ii) flagging each moved non-overflow data record as a reorganization record,
  iii) creating a reorganization pointer record for each moved non-overflow data record at the initial location of the moved record, the reorganization pointer record pointing to the new location of the moved record,
  iv) for each overflow pointer record located in the defined set of pages and associated with a moved overflow data record, creating a reorganization pointer record for the moved overflow data record at the location of the said reorganization pointer record and flagging the moved overflow record as a reorganization record,
  v) flagging each overflow pointer record pointing to an overflow record outside the defined set of pages to be a reorganization pointer record, and flagging each of said overflow records as a reorganization record, and
b) a vacate clean up step comprising the steps of
  i) deleting reorganization pointers in the defined set of pages, and
  ii) removing the reorganization record flag from each reorganization record in the database table, each fill step comprising
c) a fill move step comprising the steps of
  i) moving selected records to the defined set of pages such that the relative ordering of the selected records matches the predefined ordering constraint,
  ii) flagging each moved record as a reorganization record,
  iii) creating a reorganization pointer record for each moved non-overflow record at the initial location of the moved record, the reorganization pointer record pointing to the new location of the moved record,
  iv) creating a reorganization pointer record for each moved overflow record at the location of the overflow pointer record for the moved record, the reorganization pointer record pointing to the new location of the moved record,
d) a fill clean up step comprising the steps of
  i) deleting reorganization pointers in the defined set of pages, and
  ii) removing the reorganization record flag from each reorganization record in the database table, each clean up step being synchronized to commence at the completion of a move step and to commence only when all queries launching scanner processes commenced before the completion of a move step have completed, each move step being synchronized to commence at the completion of a clean up step and to commence only when all queries launching scanner processes after the completion of a previous move step have completed.

According to another aspect of the present invention, there is provided the above program storage device in which the method steps for performing reorganization in a database table further include the steps of a) identifying table scanner processes commencing during each move step as old table scanners, whereby old table scanners are constrained to access records in the database table by following reorganization pointers to access reorganization records, and whereby old table scanners are constrained to access reorganization records sequentially by ignoring reorganization records, and b) identifying table scanner processes commencing after the completion of a move step as new table scanners, whereby new table scanners ignore reorganization pointers in accessing records in the database table.

According to another aspect of the present invention, there is provided a program storage device readable by a machine, tangibly embodying a program of instructions executable by the machine to perform method steps for reorganizing a database table online to meet a predefined reorganization criteria, the table comprising records stored on pages, the database being subject to queries which launch scanners, the method comprising the following steps carried out for successively defined move pages in the table; the steps including:

a) a vacate move step to move data records from the move pages in the table, and b) a fill move step to move data records into the move pages in the table, each move step comprising the step of defining temporary pointers from the original position of each moved record to the moved position of the moved record, the method further comprising the step of defining selected scanners to be constrained to follow the temporary pointers while accessing records so as to maintain data ordering for the selected scanners, whereby the move steps are synchronized with query processes launching scanners so as to maintain the temporary pointers for use by said scanners launched by query processes.

According to another aspect of the present invention, there is provided the above program storage device in which the system comprises overflow pointer records, the original position of a moved record, from which a temporary pointer points, being defined to be the position of an overflow pointer record where the moved data record is originally pointed to by said overflow pointer record.

Advantages of the present invention include the ability to access the database table while the online reorganization of the database table is being made, and a reduced memory requirement during the online reorganization.

BRIEF DESCRIPTION OF THE DRAWINGS

The preferred embodiment of the invention is shown in the drawings, wherein:

FIGS. 2a, 2b, 2c, 2d, 2e, 2f, 2g, 2h, 2i, and 2j are schematic drawings showing the move of records and the creation of reorganization pointers in a reorganization in accordance with the preferred embodiment.

Figure 1A:
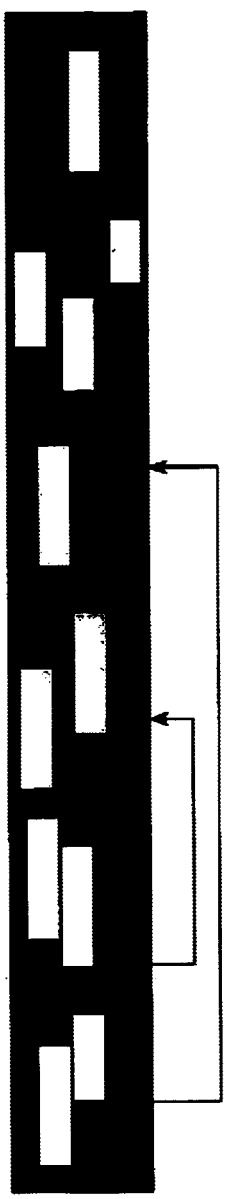
FIGS. 1a, 1b, 1c, and 1d are schematic drawings showing pages and records in an example database table illustrating reorganization of the table according to the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION

In the system of the preferred embodiment, like that of prior art relational DBMSs, such as the DB2™ DBMS product, the data in the tables of the relational database is represented as records (rows in the table) and stored in a set of pages. Each page may store more than one record, but a single record does not, in the preferred embodiment, extend beyond a single page. FIG. 1a shows, in a schematic view, pages in the example relational DBMS of the preferred embodiment, containing data for a relational database table. Individual pages 10, 12, 14, 16, 18, 20 are shown containing data and pointers in the shaded portions of the pages, and unused storage space in the blank portions. In the system of the preferred embodiment, records are identified by Record Identifiers, or RIDs, which uniquely identify records in the database table. A RID in the preferred embodiment identifies the page and location within the page where a record is located.

Relational database DBMSs such as DB2™ permit users to create indexes on user-selected fields or attributes. In the description of the preferred embodiment reference will be made to a single index. Those skilled in the art will appreciate that multiple indexes may be associated with the same database table and that the description of the preferred embodiment will also pertain to tables with multiple indexes. Selected fields (or attributes) used for an index on a table are collectively termed a key for the index. The table's records may be arranged such that the records themselves are partially or wholly ordered in relation to the key values for the records. Where a table has significant ordering of its records in relation to a defined key, the table is said to be clustered in relation to that key. A clustered table is more efficient where operations are carried out on the table based on the key.

Relational DBMSs provide utilities to permit database tables to be reorganized to increase the clustering of the records in the table, based on a given key. As is described in more detail below, the preferred embodiment supports the reorganization of data in a relational database table to increase clustering.

A further reason to reorganize the records in a relational database table relates to how relational DBMSs such as DB2™ handle changes to data in the table. Where a record on a given page is changed by a user to become larger, such that the record cannot be stored on the given page, a pointer (or tombstone) record is stored in the page and the initial record is moved to a different page, where it can be accommodated. The pointer or tombstone left in the first page points to the new position of the modified record. Such a moved record is referred to as an "overflow record" and its pointer is called an "overflow pointer."

Where data in a relational database table has been heavily modified, there may be a significant number of tombstones present in the pages of the table data. The access to data for the table will be potentially affected negatively if there are numerous such pointers that must be followed before data may be accessed. A reorganization of such a table will reduce the numbers of overflow pointers by rewriting overflow records on pages that can accommodate the records and thus converting them to regular records.

A further factor that influences reorganization of database tables is the need to reorganize free space in the pages of the table. After use, free space in the pages of the table data may become unevenly distributed among the pages. A reorganization of the data in the pages permits free space to be more evenly distributed to meet a desired distribution pattern for free space in the pages of the database table.

Figure 1B:
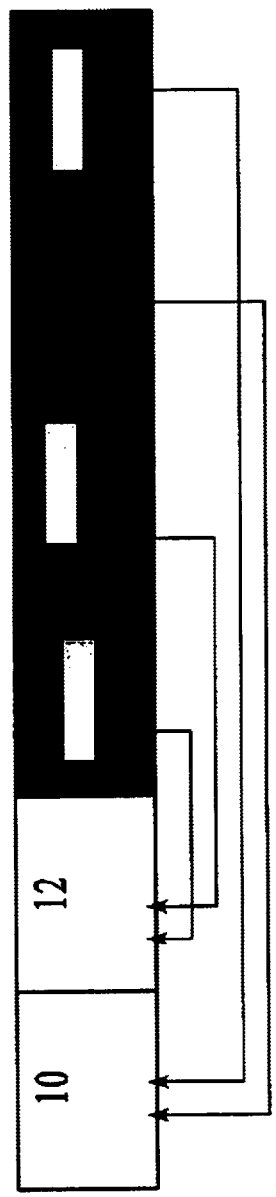

The reorganization of the preferred embodiment is carried out in several steps. The first step is for the records in a defined set of pages to be relocated in free space in other pages in the table data. This is referred to as a vacate step, and the defined set of pages the vacate range. FIG. 1b shows the pages of the example table data after a first vacate step. Pages 10, 12 are shown as empty in FIG. 1b.

In the implementation of the preferred embodiment, in DB2™, there is manipulation of the FSCR record entries for the pages in the vacate range to prevent rows being inserted into those pages which are being vacated. This manipulation (the free space cached page is defined to point to the page following the vacate range if it is otherwise pointing into the vacate range of pages) effectively blocks use of the vacate range of pages. The free space search algorithm is similarly prevented from selecting free space on vacate pages until the reorganization no longer requires that space.

After the vacate step there is a fill step where records are moved into the defined set of pages (the vacate range). In the preferred embodiment, the records are moved in accordance with their key value order. It will be appreciated by those skilled in the art that benefits from table reorganization (reduction in overflow pointer records and better distribution of free space) are achieved even where records are moved without regard to key value order.

Figure 1C:
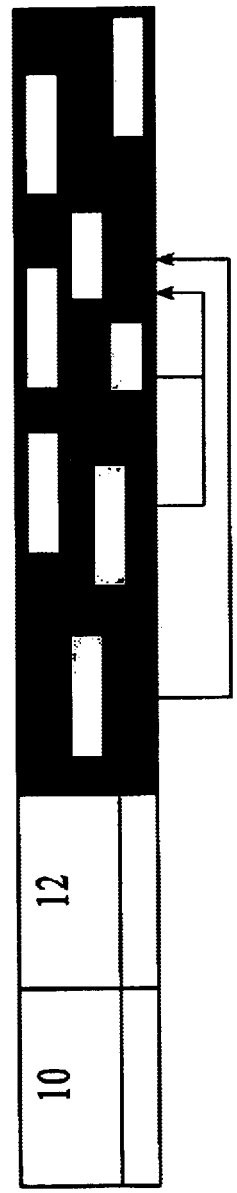

FIG. 1c shows the pages of the example table data after a first fill step. As is shown by the empty portions of pages 10, 12 in FIG. 1c, a percentage of space within the pages is reserved for future use. This free space is available to accommodate enlarged records and the addition of new records on the page. The fill step may be carried out to give the records in the filled portion of the table a defined ordering. In the preferred embodiment, the ordering is the ordering defined by the clustering index for the records. The fill step therefore uses a scan of the clustering index to identify the records that are to be moved into the appropriate pages of the database table during the each fill step. Rows are inserted into the space vacated in the clustering index order. The position within the scan on the index is maintained between fill steps.

Figure 1D:
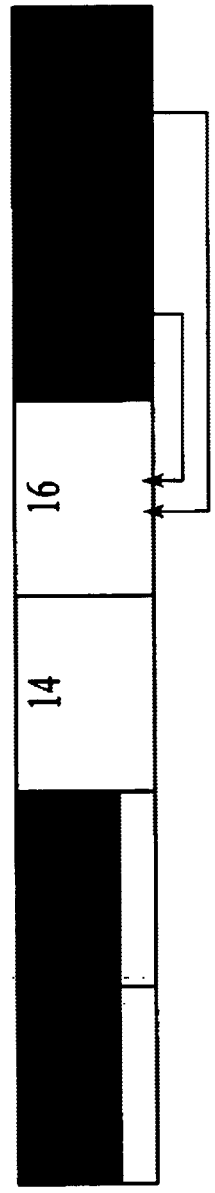

FIG. 1d shows pages 14, 16 being emptied of records after a second vacate step being carried out on the table data of the example. This repetition of vacate and fill steps is carried out until all data has been reorganized in the table. The defined set of pages (the vacate range of pages) is moved, according to a defined sequence, through the database until a desired degree of reorganization of the database table is achieved. In the preferred embodiment, the sequence of movement of the vacate range through the table is linear, but other patterns of movement could be used as required by the structure of a particular DBMS or the characteristics of data in a specific table.

By carrying out the reorganization of the database table in this manner, the data is reorganized without incurring the data storage costs inherent in generating a shadow table as is done in certain prior art systems.

In the reorganization of the preferred embodiment, accessing records in the table may result in inconsistencies if certain steps are not taken. In relational database DBMSs, it is common to access records in a table by reading sequentially from the table, rather than by accessing an index to identify specified records. Where records have keys not suitable for index access are accessed, relational DBMSs typically scan the table data to retrieve the appropriate records. The entire table or a subset of the table may be scanned. A process that reads successive records in the table data is referred to as a "table scanner." Similarly, where a process accesses RIDs in the leaf nodes of an index sequentially, the process is said to be an "index scanner". As indicated below, index and table scanner share certain characteristics and are therefore treated in a similar fashion in some respects by the preferred embodiment.

Where a table scanner is reading successive records in a table, and a reorganization as described above is being carried out, it is possible for the table scanner to miss records or to retrieve the same record twice. Records may be missed when a table scanner has read records from a page in the table data and the record is later moved into that page from a page that the table scanner has yet to reach. Similarly, a table scanner may retrieve a record twice by retrieving a record from a page once and then, after the record is moved to a new page, reading and retrieving the same record on the new page. As is described below, an analogous issue exists also for index scanners.

It is necessary to prevent the above problem with table scanners when reorganizing a database table online in the manner set out above. One way to achieve this is to lock out table scanners from use of the table while records are being moved in the database. This may be a practical solution for databases that have periods where table scanners are not likely to be created. However, this approach to table reorganization, while providing advantages compared to taking the entire table offline for the time that the database table is being reorganized, does result in users being denied full access to the data in the table being reorganized.

The online reorganization of a database table according to the preferred embodiment, which permits index and table scanners to correctly retrieve records from a database table during the reorganization, is set out below.

The approach of the preferred embodiment employs a two-step process involving temporary pointers (referred to below as reorganization pointers) which track the movement of records during the reorganization of a database table, and which are later removed. The first step is a move step in which the temporary pointers are created, and the second step is a clean up step in which the pointers are removed.

The approach identifies scanners as they access records in the database table and synchronizes steps in the reorganization based on the completion of queries which give rise to scans. In this way, users fully access the database table, and table scanners continue to read records from the database table, while the reorganization is being carried out.

Figure 2A:
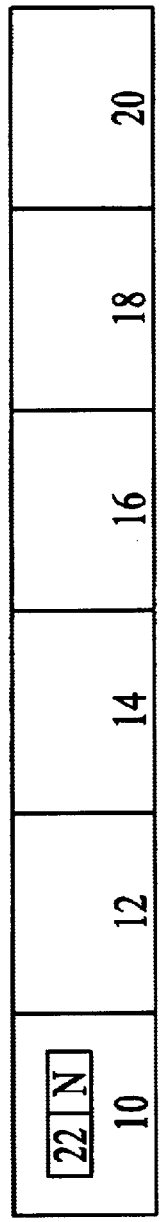
Figure 2B:
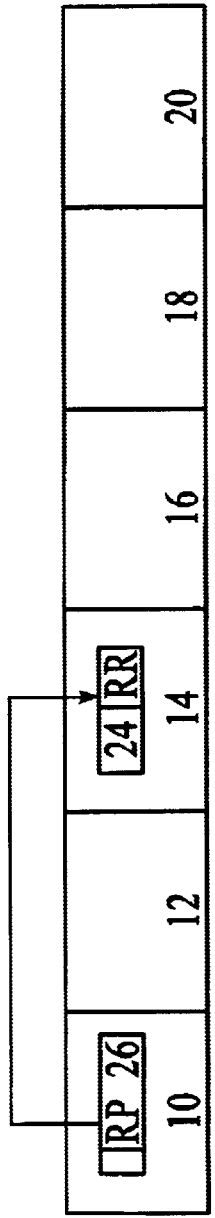

In accordance with the preferred embodiment, when a record is moved in a move step (in either the vacate or fill step in the reorganization, as described above), the record is not simply copied to the new location and then deleted from the old location. Instead, as is illustrated with reference to FIG. 2, in appropriate cases, when the record is copied to the new location in a move step, a type tag associated with the record identifies it as a "reorganization overflow" record. In the example of FIG. 2, a record 22 is being moved from page 10, as shown in FIG. 2a. FIG. 2b shows the record copied to reorganization overflow record 24 in page 14 of the example database table. At the initial location of the record in page 10, FIG. 2b shows the record replaced by "reorganization pointer" record 26, which points to reorganization overflow record 24 in page 14.

The move of the record in a move step may be either out of a defined set of pages in a vacate step or into a defined set of pages in a fill step.

Figure 2C:
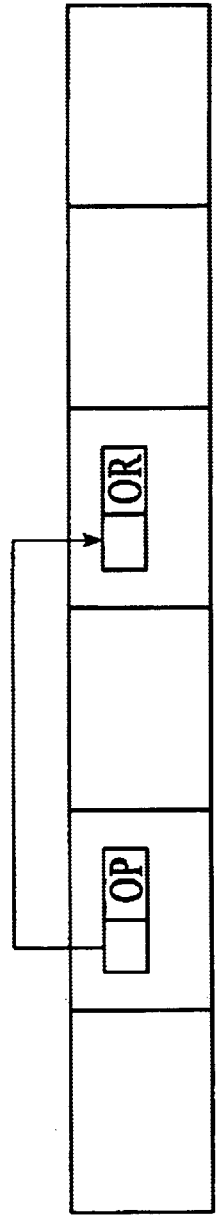
Figure 2D:
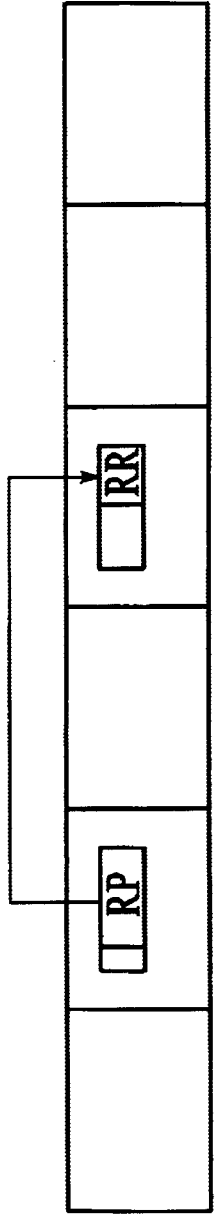
Figure 2I:
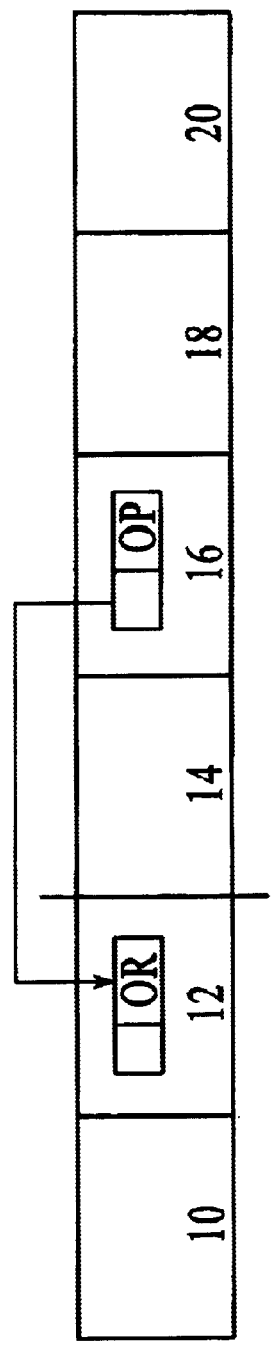
Figure 2J:
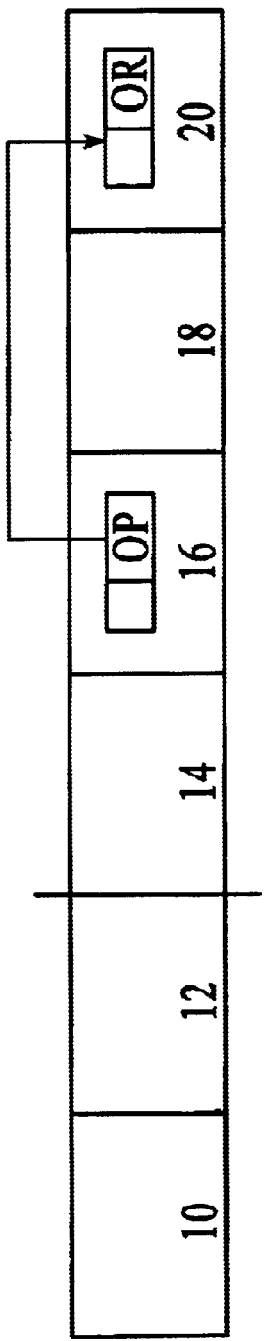

The above description applies where a normal record is located in the pages of the vacate range or is being moved into the pages of a vacate range. Other rules apply for overflow records, depending on the type of move being carried out (part of a vacate or fill step). In FIGS. 2c to 2j, the vacate range is defined as pages 10, 12. A reorganization pointer record is denoted "RP", a reorganization overflow record is denoted "RR", an overflow pointer is shown as "OP" and an overflow record is shown as "OR". The following table sets out the different rules in the preferred embodiment as they are reflected in FIGS. 2c to 2j:

| | |
|---|---|
| An overflow pointer (or tombstone) record is in the vacate range, and the overflow record is outside the vacate range (as is shown in FIG. 2c). | For a move in a vacate step, the pointer is converted to a reorganization pointer and the overflow record is converted to a reorganization overflow record. There is no move of the overflow record as it is already outside the vacate range (as is shown in FIG. 2d). |
| An overflow pointer and overflow record are both located in the vacate range (as is shown in FIG. 2e). | For a move in a vacate step, the overflow pointer is converted to a reorganization pointer and the overflow record is moved out of the vacate range and identified as a reorganization overflow record (as is shown in FIG. 2f). |
| An overflow pointer and overflow record are located outside the vacate range (as is shown in FIG. 2g). | For a move in a fill step, the overflow record is moved into the vacate range and converted to a reorganization overflow record, and the overflow pointer is converted to a reorganization pointer (as is shown in FIG. 2h). |
| An overflow record is located in the vacate range and the overflow pointer is outside the vacate range (as is shown in FIG. 2i). | For a move in a vacate step the overflow record is moved and the overflow pointer is updated to reflect the new location of the overflow record (as is shown in FIG. 2j). |

When each record is moved within the database table, the indexes associated with the table are updated. The record identifiers (RIDs) in the leaf nodes of the indexes are updated to point to the new location of the record. In the preferred embodiment, as is described in more detail below, changes are also made to the RID map and logging data structures associated with the database table and indexes.

Following each move step, a "clean up" step is carried out. Thus for each vacate step there is a move step in which records are moved out of a defined set of pages in the database table, followed by a clean up step. Similarly for each fill step there is a move step in which records are moved into the vacated pages, followed by a clean up step. In the clean up step, the reorganization pointer records which have been created in the move step are removed. The type tags identifying the moved records as reorganization overflow records are also changed to identify those records as normal records.

Although in the description provided above, pages in the database table are referred to above as being "vacated", it is apparent that reorganization pointers remain in the pages in the defined set of pages (the vacate range). The clean up step results in the reorganization pointer records being deleted. The locations occupied by the deleted reorganization pointer records then become part of the free space of the respective pages.

In the implementation of the preferred embodiment, a RID mapping table (or RID map) is used to record information relating to records that are moved and the state of such moved records.

In the terminology of the preferred embodiment, an "old RID" is the record at the original location (prior to the move step in a reorganization) and a "new RID" is the record at the new location.

In the preferred embodiment in the clean up step the reorganization process accesses the information in the RID map to determine what changes to make in the database table. Index scans also use the RID map to ensure that the correct records are accessed in a database table that is undergoing a reorganization. The RID map is maintained in memory for quick access. In the implementation of the preferred embodiment, the RID map is a hash table implemented with a hash on the new RID, and a hash table containing the reverse RID mapping is also maintained.

The RID map contains the old RID and the new RID, as well as the state of the record (or row) for each moved record. The state of the row is stored as a flag field, where bit flags indicate (a) whether the move of the row (record) has been completed, (b) whether the reorganization clean up is complete for the row, and (c) whether the row has been deleted by another application after it has been moved (a correctness check for when a record is deleted after a move but before the clean up step).

With respect to table scanners, the preferred embodiment provides for a mechanism to prevent the table scanners missing or duplicating data. A table scanner is identified as an "old table scanner" where the table scanner is operating on a database table during the time that records are moved (i.e. during the move step in a vacate or a fill step, or, as is described in more detail with reference to FIG. 3, below, during the period that the reorganization process is waiting to move records).

The preferred embodiment provides that old table scanners will ignore records that are identified as being reorganization overflow records. Old table scanners will also follow reorganization pointers when they come to reorganization pointer records. In this way, an old table scanner will see the records in the database table in the correct order while it is ensured that there are no missed records or records read twice by the table scanner.

Similarly, where a table scanner is launched when there is no movement of records occurring (as is described in more detail below with reference to FIG. 3) the table scanner is identified as a "new" table scanner. The new table scanner will ignore reorganization pointer records but will recognize reorganization overflow records. Thus a new table scanner will see the database table as it is ordered after the vacate or fill step.

The clean up phase described above is restricted to be carried out only when all queries which launch "old" table scanners have been completed. In this way, the user is able to access the database table either through the table indexes or by operations which scan the table. Where operations result in index-based access, the RIDs in the index will point directly to the records. Similarly, where table scanners access the database table, the old table scanners will see the pre-move ordering of the records while the new table scanners will see the moved ordering of the data.

The clean up phase is synchronized with the table scanners so that only after the queries which utilize table scanners that rely on the initial positioning of the records are complete will the reorganization pointers which reflect that initial positioning be deleted (in the clean up step). In the preferred embodiment, the synchronization of the reorganization process is related to the completion of queries which launch table scanners because the queries may include other processing which relies on the database table ordering and which processing follows the completion of the table scanner's reading of records from the database table.

In the preferred embodiment, the synchronization of the move and clean up steps is implemented using two latches:

a "don't move" latch and a "don't clean" latch. The synchronization is the same whether the move step is part of a vacate step or a fill step.

Although the above synchronization is described with reference to table scanners, it will be appreciated by those skilled in the art that there are certain scanners of indexes which may be used in a manner that the RIDs returned by the index scanners are required to be consistent across the index scans. For this reason, in the preferred embodiment the synchronization between index scanners and the reorganization steps is carried out in the same manner as is the synchronization of table scans and the reorganization steps.

Figure 3:
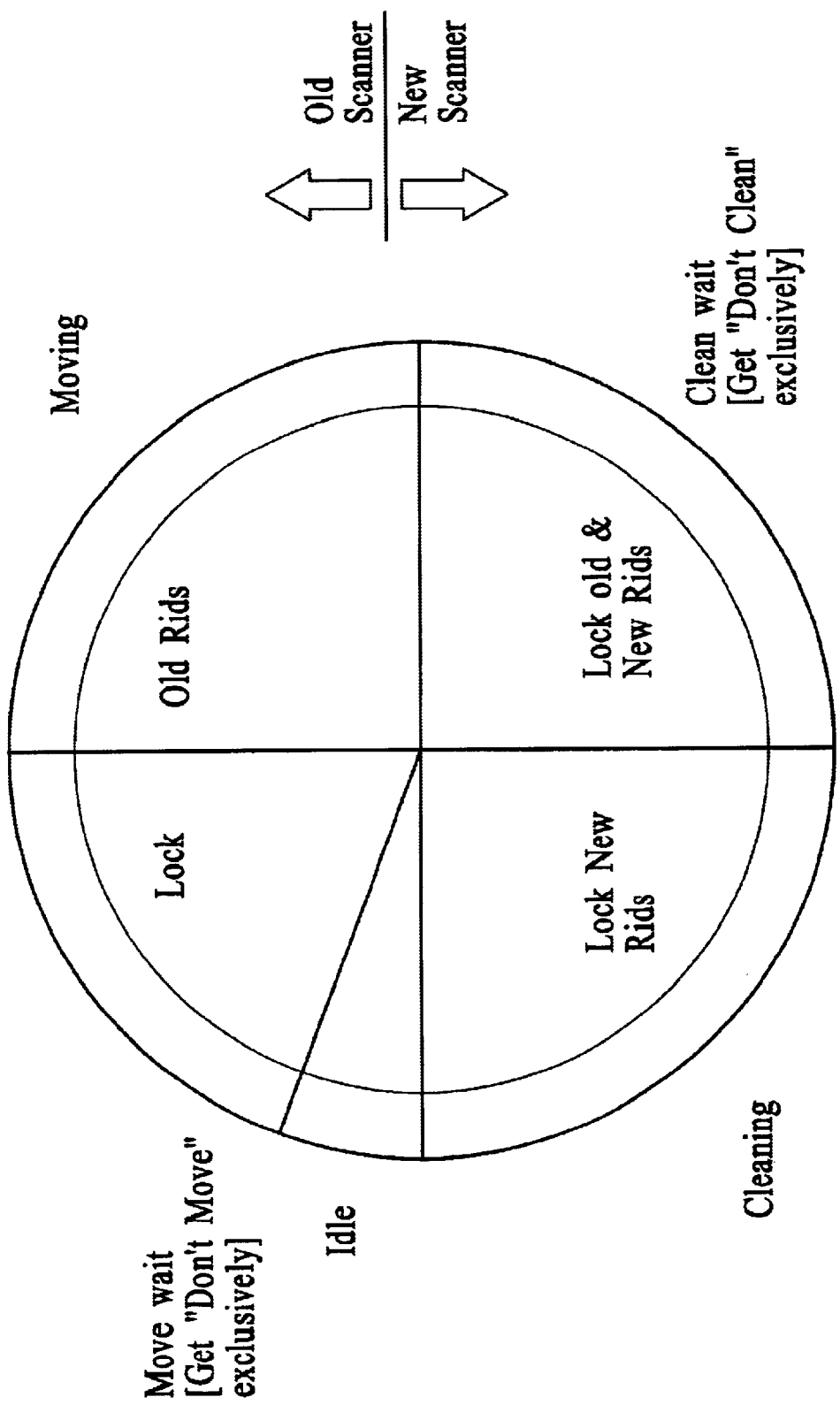
FIG. 3 is a state diagram showing the states for the reorganization process of the preferred embodiment.

The manner in which scanners are synchronized with the clean up and move steps may be seen with reference to FIG. 3, which is a state diagram for the preferred embodiment. FIG. 3 shows the five states of a reorganization process of the preferred embodiment: Idle, MoveWait, Moving, CleanWait and Cleaning. The state machine of FIG. 3 is read clockwise. The MoveWait and CleanWait states are indicated in FIG. 3 as waiting on exclusive gets of the defined latches "don't move" and "don't clean", respectively.

Applications that open a scan on the database table or index will acquire each latch in a share mode. A scanner process (either a table scanner or an index scanner) checks the state of the reorganization to determine whether the scanner is an "old" scanner or a "new" scanner. In the preferred embodiment, the state of the reorganization process is posted to a blackboard in the system. If the state of the reorganization is Idle, MoveWait or Moving, the scanner is identified as old, otherwise the table scanner is defined as new. As shown by the large arrows in FIG. 3, old scanners get the "don't clean" latch in share mode. Similarly, new scanners get the "don't move" latch in share mode.

A table or index scanner releases the "don't move" or "don't clean" latches when the query which launched the scanner has been completed. This use of the two latches ensures that the reorganization process remains in CleanWait state until the queries which launched all old scanners have been completed. The reorganization process will then be able to get the "don't clean" latch exclusively, and the reorganization process will enter the Cleaning state which results in reorganization pointers being deleted, as described above. Similarly, when the reorganization process is in the MoveWait state it seeks an exclusive get of the "don't move" latch. This latch will only be available when the queries giving rise to all new scanners have been completed.

FIG. 3 shows the Idle state for the reorganization process. This indicates a period of time when the reorganization process is not attempting to make progress in reorganizing the database table. There are a variety of methods for controlling when the reorganization process is idle or active. For example, the process may be forced to be idle during prime work hours or there may be a delay between phases to limit the use of system resources by the reorganization.

In the preferred embodiment, there is a further synchronization issue which arises because indexes in the preferred embodiment use ordered lists to store RIDs for database table records which have the same key value. The indexes in the preferred embodiment use a b-tree structure in which the leaf nodes store RIDs identifying records in the database table. Where there is more than one record in the database table having the same key value, the leaf node in the index maintains the RIDs in an ordered list associated with the key value. The list is ordered by the location of the records in the database table.

As will be apparent to those skilled in the art, when a record having an RID in an ordered list in the index is moved in the database table, a change in the ordered list will be required. Although there is an S-lock which permits a single entry in one or more indexes to be updated to show the updated RID, a change in the ordered list requires a further synchronization issue to prevent index scanners from accessing the same RID in the ordered list twice, or from missing the RID as it is moved within the ordered list. The issue here relating to index scanners in the ordered list is similar to that described above in relation to table scanners. As will be understood by those skilled in the art, where an implementation of an index does not use ordered lists for the storage of duplicate key value RIDs, this issue will not necessarily be relevant.

The preferred embodiment synchronizes index scanners in an ordered list and the reorganization process by using a key value lock which prevents the updating of an index ordered list where an index scanner is accessing the ordered list. Index scanners get the key value lock in share mode and the reorganization process gets the key value lock in exclusive mode. The index scanners maintain their key value lock across calls to the index manager process, releasing the lock only when the scan moves to a new key value (i.e. when it has finished scanning the ordered list).

The reorganization process will hold the exclusive lock for at least the move of one record. As will be apparent to those skilled in the art, the reorganization process may in certain circumstances be designed to hold the key value lock for multiple rows where it is determined that holding the key value lock will synchronize the index scanners and the reorganization process in a manner to increase efficiencies. An example is where in the fill step, the index being scanned is the index which defines the clustering of the records. In such a case index scanners are not permitted to access a key range during the fill step of the reorganization and such scanning is restricted to the ordered list before the update or after the update.

FIG. 3 also shows how synchronization between different scanners is achieved in the preferred embodiment. In the preferred embodiment, which is implemented in a DB2™ relational DBMS, record movement will be carried out with locking. In the preferred embodiment, when a row (record) is moved, it will be S-locked with medium duration. All affected rows will also be S-locked. The row locks will be released after the record is moved to allow access to the row or record. The preferred embodiment uses a relatively small number of locks for relatively short periods of time. The S-lock on a moved record permits the index RIDs for the moved record to be updated.

A similar locking mechanism will be used during the clean up step. An S-lock of medium duration will be imposed for each row that is subject to the clean up step. The lock is released when the clean up is complete. The number and duration of locks are relatively limited for the clean up phase, also.

When a scanner is accessing the database table it will lock certain records. Because table scanners read different records, depending on whether the scanner is a new or old scanner, the records that are locked will depend on the type of table scanner and the state of the reorganization.

The state diagram of FIG. 3 indicates that when the database table is being accessed and the reorganization is in one of the Idle, MoveWait or Moving states, the access will lock old RIDs. When the reorganization is in the Cleaning state, new RIDs will be locked. When the reorganization is in the CleanWait state, both new and old RIDs will be locked.

The RID map is used where an index RID is a new RID but an old RID must be locked. In such a case, the RID map will be read to determine the old RID corresponding to the new RID. The old RID will then be locked. A similar use of the RID map is made where both RIDs must be locked. If a new RID is being read, the RID map is used to determine the old RID and lock that RID, as well as the new RID.

The above mechanism provides for locks which synchronize between scanners. The RID map is also used where an application deletes a row (record) before the record is subject to a clean up step. The RID map includes a deleted record flag which confirms that the record has been deleted and the old RID (the reorganization pointer) does not point to a valid record.

In the preferred embodiment implementation, there are overflow records which are potentially present in the database table. In addition, applications which access the database table during the reorganization are also able to increase the size of records which are flagged as reorganization records. This will occur where a moved record is modified before the clean up step begins. The implementation of the preferred embodiment has a reorganization intermediate pointer. A reorganization intermediate pointer is placed in the location of the reorganization record which has been increased in size and moved to an overflow record location. The moved reorganization record is moved and inserted as a regular overflow record. In the preferred embodiment, new scanners are defined to follow reorganization intermediate pointers and ignore regular overflow records. In this way the moved reorganization record is handled correctly by scanners accessing the table during the reorganization.

It will be understood that the decision to move records in the online reorganization will be determined by the objectives of the online reorganization. The preferred embodiment described above reorganizes the records in the database table based on the cluster index associated with the database table. A reorganization process for a table database which is not clustered may carry out record move steps for the purpose of more efficient distribution of free space in the pages of the database table. Such a reorganization will benefit from the approach of the invention although it will not require use of the index as set out in the preferred embodiment described above.

In the system of the preferred embodiment, the DBMS permits error recovery to be carried out. The online reorganization of the preferred embodiment includes mechanisms to permit successful rollback and recovery of the database table and indexes in a reorganization when a recovery is carried out. Data corresponding to steps taken in the reorganization are logged to permit an accurate recovery.

During the move steps described above, record contents are logged to provide full recoverability. Similarly, clean up processing is also logged. The preferred embodiment is designed to ensure correct error recovery with a limited amount of logging. In the preferred embodiment, the log records are available where reorganization steps are to be undone (the UNDO command) or redone (REDO). The log records which are flagged as being reorganization log records cause the UNDO and REDO processing to access the RID map, where necessary, to determine the appropriate actions for undoing or redoing logged steps.

In the preferred embodiment, log entries are created to indicate the each of the following:

a) the start of each move step (SQLD-ONLINE-TABLE-REORG);

b) the move of a normal record (SQLD-MOVE-NORMAL);

c) the move of a pointer record where, during a vacate step, the associated overflow record is not in the vacate range (SQLD-MOVE-POINTER);

d) the move of a pointer record where, during a vacate step, the associated overflow record is in the vacate range (SQLD-MOVE-POINTER-CONVERT);

e) the move of an overflow record during a vacate phase (SQLD-MOVE-OVER-FLOW);

f) the successful move of a record (SQLD-ROW-MOVED);

g) the successful clean up of a row that has been moved (SQLD-CLEANUP-ROW);

h) the completion of the online reorganization (SQLD-OLR-TERMINATE).

With respect to index recovery, the system of the preferred embodiment adds a reorganization process flag to log records for deleting and inserting key values (index log records delkey, addkey, and update) which are found in the DB2™ system. For example, for unique indexes and for non unique indexes where the update only affects a single page, a new reorganization process index update log record will be written.

Recovery processing relies on both the data logged during the reorganization and the RID map. For example, the RID map is used to determine whether a moved record (row) is to be rolled back, cleaned up or ignored (in the case that the row was deleted) during recovery processing (UNDO in the system of the preferred embodiment). If a row was moved successfully, it is cleaned up. If it was still in the process of being moved, it will be rolled back. During recovery, if the reorganization process unit of work (a move/cleanup step) is still inflight, the RID map will exist. In addition, there will be an entry in the RID map for each row moved or in the process of being moved. Where the reorganization process unit of work has already committed, the RID map may not exist during recovery but in such a case the unit of work will not be rolled back as there is nothing to recover.

During UNDO, all delkey/addkey/update index log records will be checked for the reorganization process flag. If the flag is set and the row is marked as having being successfully moved in the RID map, the log record is ignored. If the row is not marked as being successfully moved in the RID map, the delkey/addkey/update as logged is undone. For index log records, the flag indicating whether the row has been deleted is irrelevant since a row which is still in the process of being moved cannot be deleted. If an index log record is to be undone, an entry is guaranteed to exist in the RID map for the row. In the system of the preferred embodiment, during a REDO, the following actions will be performed for each log:

| | |
|---|---|
| SQLD-ONLINE-TABLE-REORG | If the RID map is not yet allocated, allocate it, otherwise reinitialise the RID map; If necessary, allocate other resources required for the reorganization process (for example a reorganization process control block) |
| SQLD-MOVE-NORMAL, SQLD-MOVE-POINTER, SQLD MOVE-POINTER-CONVERT | If any of the pages do not have the update applied, apply the changes. Add an entry for the row to the RD map. |
| SQLD-MOVE-OVERFLOW | If any of the pages do not have the update applied, apply the changes. An entry is not added to the RID map for this log record. |

-continued

| | |
|---|---|
| SQLD-ROW-MOVED | If there is an entry in the RID map for the row, set the flag for the row to indicate that the row has been moved successfully. If there is no entry in the RID map for the row, add an entry for the row and also set the flag indicating that the row has been moved successfully. |
| SQLD-CLEANUP-ROW | If any of the updates performed in the cleanup have not been applied, apply the update. If the RID map exists and there is an entry for the row in the RID map, mark the row as having being cleaned up. If the RID map does not exist or there is no entry for the row in the RID map, there is no need to update the RID map as the transaction must have committed or rolled back. If the transaction was still active, the SQLD-ROW-MOVED log record would have added an entry to the RID map for the row. |
| SQLD-OLR-TERMINATE | If the reorganization process resources and/or RID map are allocated, deallocate the memory. |
| DELKEY/ADDKEY/UPDKEY | Redo the actions if required. |

During an UNDO process, in the system of the preferred embodiment the following actions will be performed for each log record:

| | |
|---|---|
| SQLD-ONLINE-TABLE-REORG | Deallocate memory for the reorganization process control block and RID map if still allocated |
| SQLD-MOVE__NORMAL, SQLD-MOVE__POINTER, SQLD-MOVE-POINTER-CONVERT | For these log records, there must be an entry in the RID map for the rows moved successfully (the transaction is still active). For all rows moved successfully, the SQLD-ROW-MOVED log record has added an entry to the RID map if the log record being undone was not redone.<br>If the row is marked as being in the process of being moved in the RID map, undo the changes. If the row is marked as having been moved successfully in the RID map but not yet cleaned up, perform cleanup for the row. If the row is marked as having already been cleaned up in the RID map, ignore the log record. If an entry does not exist in the RID map for the row, undo the changes. It is an error if the RID map does not exist. |
| SQLD-OLR-TERMINATE | Deallocate memory for the reorganization process control block and RID map if still allocated |
| SQLD-MOVE-OVERFLOW, SQLD-ROW-MOVED, SQLD-CLEANUP-ROW | These are REDO ONLY log records |
| DELKEY/ADDKEY/UPDKEY | If, the log record was written by the reorganization process and the row has been marked as having been moved successfully in the RID map (regardless of whether it has been cleaned up), ignore the log record (do not undo the changes). If the row is marked as being in the process of being moved or there is no entry in the RID map for the row, undo the changes. It is an error if the RID map does not exist. |

By maintaining log entries for the above information, and carrying out the actions set out above for the redo and undo processes, it is possible to ensure that the preferred embodiment will provide for consistent roll back and recovery of the database table, despite the existence of a reorganization.

Although a preferred embodiment of the present invention has been described here in detail, it will be appreciated by those skilled in the art, that variations may be made thereto, without departing from the spirit of the invention or the scope of the appended claims.

What is claimed is:

1. A method for reorganizing a database table online, allowing the database table to be scanned, accessed and updated during the reorganization, the method steps comprising:
   a) moving a subset of records within the database table;
   b) flagging each moved record as a reorganization record;
   c) creating a reorganization pointer record for each moved record at the initial location of the moved record, the reorganization pointer record pointing to the new location of the moved record; and
   d) establishing scanner process constraints based on whether a scanner process is commenced prior to or after the moving, wherein the scanner process can correctly retrieve records from the database table during the reorganization of the database table, including before and after movement of records in the reorganization.

2. The method of claim 1 wherein the establishing further comprises:
   d1) identifying table and index scanner processes commencing prior to the completion of the moving as old table scanners wherein old table scanners are constrained to access records in the database table by following reorganization pointers to access reorganization records and wherein old table scanners are constrained to ignore reorganization records when accessing records sequentially in a scan of the database table; and
   d2) identifying table and index scanner processes commencing after the completion of the moving as new table scanners, wherein new table scanners are constrained to ignore reorganization pointers in accessing records in the database table.

3. The method of claim 2 further comprising the steps of:
   e) deleting the reorganization pointer records and removing the reorganization record flag from the records flagged after each query associated with an old table scanner is complete; and
   f) repeating steps a-d after the completion of each query associated with a new scanner until the records in the database table meet a reorganization criteria.

4. The method of claim 3 in which step f) alternates between moving records from a one of successively defined portions of the table and moving records in a predefined order into a one of the successively defined vacated portions of the table.

5. The method of claim 4 in which the predefined order for moving records is defined by a clustering index associated with the table.

6. The method of claim 4 in which the table further comprises overflow pointer records pointing to overflow records and in which the method steps further comprise steps defining each overflow pointer record in a one of the successively defined portions of the table to be a reorganization overflow pointer record, and flagging the associated overflow record to be a reorganization record.

7. The method of claim 4 in which the method steps further comprise the step of preventing the allocation of space for new or updated records in each respective one of the successively defined portions of the table when moving records from the one of successively defined portions of the table.

8. The method of claim 3 wherein the deleting further comprises requesting and waiting for the exclusive availability of a latch which is shareable by each old table scanner process and which each old table scanner process obtains before commencing scanning and releases after the query associated with the old table scanner process has completed processing.

9. The method of claim 8 in which the latch is shareable by each index scanner process and each index scanner process obtains the latch before commencing scanning and releases the latch after the query associated with the index scanner process has completed processing.

10. The method of claim 3 in which the method steps further comprise steps to maintain the identity and status of moved records in a record identifier mapping table.

11. The method of claim 10 in which the record identifier mapping table comprises a mapping record corresponding to each of the moved records, each mapping record comprising an old record identifier for the initial position of the moved record, a new record identifier for the moved position of the moved record, and a status flag for the moved record.

12. The method of claim 11 in which the status flag for the moved record comprises flags to indicate the completion of the move of the record, the completion of the clean up for the record, and whether the record has been deleted.

13. The method of claim 10 in which the record identifier mapping table comprises a hash table implemented having a hash on the new record identifier, and a hash table containing a reverse record identifier mapping.

14. The method of claim 3 in which the method steps further comprise logging steps for retaining data values relating to:

1) the start of step a), 2) the move of a normal record, 3) the move of a pointer record where, when moving records from a one of successively defined portions of the table, the associated overflow record is not in the vacate range, 4) the move of a pointer record where, when moving records from a one of successively defined portions of the table, the associated overflow record is in the vacate range, 5) the move of an overflow record during a vacate phase, 6) the successful move of a record, 7) the successful clean up of a row that has been moved, and 8) the completion of the online reorganization, wherein the table may be rolled back without the loss of data due to the reorganization of the table.

15. The method of claim 3 in which the method steps further comprise the step of imposing a key value lock where an index scanner is accessing an ordered list of key values in an index associated with the table, the key value lock preventing index values from being updated while the index scanner accesses the ordered list of key values.

16. The method of claim 3 in which the method steps further comprise the step of synchronising between scanners by imposing a share lock on records subject to the moving and records subject to the deleting.

17. The method of claim 3 in which the method steps further comprise an idle step in which neither the moving nor the deleting is performed.

18. A method for reorganizing a database table online, allowing the database table to be scanned, accessed and updated during the reorganization, the method comprising the steps of:

a) a vacate move step that relocates a subset of records in a defined set of pages to available space within the database table using temporary pointers;

b) a vacate clean up step that removes the temporary pointers of the vacate move step;

c) a fill move step that moves selected records to the defined set of pages using temporary pointers; and d) a fill clean up step that removes the temporary pointers of the fill move step, wherein each clean up step is synchronised to commence at the completion of a move step and to commence only when all queries launching scanner processes commenced before the completion of a move step have completed and each move step is synchronised to commence at the completion of a clean up step and to commence only when all queries launching scanner processes after the completion of a previous move step have completed.

19. The method of claim 18 wherein step a) comprises:

i) moving each data record in a defined set of pages to a new location in a page in the database table outside the defined set of pages;

ii) flagging each moved non-overflow data record as a reorganization record;

iii) creating a reorganization pointer record for each moved non-overflow data record at the initial location of the moved record, the reorganization pointer record pointing to the new location of the moved record;

iv) for each overflow pointer record located in the defined set of pages and associated with a moved overflow data record, creating a reorganization pointer record for the moved overflow data record at the location of the said reorganization pointer record and flagging the moved overflow record as a reorganization record; and v) flagging each overflow pointer record pointing to an overflow record outside the defined set of pages to be a reorganization pointer record, and flagging each of said overflow records as a reorganization record.

20. The method of claim 1, wherein step b) comprises:

i) deleting reorganization pointers in the defined set of pages; and ii) removing the reorganization record flag from each reorganization record in the database table.

21. The method of claim 1, wherein step c) comprises:
i) moving selected records to the defined set of pages such that the relative ordering of the selected records matches the predefined ordering constraint;
ii) flagging each moved record as a reorganization record;
iii) creating a reorganization pointer record for each moved non-overflow record at the initial location of the moved record, the reorganization pointer record pointing to the new location of the moved record;
iv) creating a reorganization pointer record for each moved overflow record at the location of the overflow pointer record for the moved record, the reorganization pointer record pointing to the new location of the moved record.

22. The method of claim 21 wherein step d) comprises:
i) deleting reorganization pointers in the defined set of pages; and
ii) removing the reorganization record flag from each reorganization record in the database table.

23. The method of claim 22 wherein table scanner processes commencing during each move step are identified as old table scanners, wherein old table scanners are constrained to access records in the database table by following reorganization pointers to access reorganization records and are further constrained to access reorganization records sequentially by ignoring reorganization records and table scanner processes commencing after the completion of a move step are identified as new table scanners, wherein new table scanners ignore reorganization pointers in accessing records in the database table.

24. The method of claim 22 in which each clean up synchronisation step comprises requesting and waiting for the exclusive availability of a latch which is shareable by each old table scanner process and which each old table scanner process obtains before commencing scanning.

25. The method of claim 22 in which the method further comprises the step of preventing the allocation of space for new or updated records in each respective one of a sequentially advancing defined set of pages during the vacate move step for the said one of the sequentially advancing defined set of pages.

26. The method of claim 22 in which an identity and status of moved records is maintained in a record identifier mapping table.

27. The method of claim 26 in which the record identifier mapping table comprises a mapping record corresponding to each of the moved records, each mapping record comprising an old record identifier for the initial position of the moved record, a new record identifier for the moved position of the moved record, and a status flag for the moved record.

28. The method of claim 27 in which the record identifier mapping table comprises a hash bucket comprising a hash on the new record identifier, and a hash table containing a reverse record identifier mapping.

29. The method of claim 22 in which the database table has an associated index and in which each fill step selects records by scanning the associated index of the database table.

30. A computer readable medium containing program instructions for reorganizing a database table online, allowing the database table to be scanned, accessed and updated during the reorganization, the program instructions comprising the steps of:
a) moving a subset of records within the database table;
b) flagging each moved record in as a reorganization record;
c) creating a reorganization pointer record for each moved record in at the initial location of the moved record, the reorganization pointer record pointing to the new location of the moved record; and
d) establishing scanner process constraints based on whether a scanner process is commenced prior to or after the moving, wherein the scanner process can correctly retrieve records from the database table during the reorganization of the database table, including before and after movement of records in the reorganization.

31. The computer readable medium of claim 30 wherein step d) further comprises:
d1) identifying table and index scanner processes commencing prior to the completion of the moving as old table scanners wherein old table scanners are constrained to access records in the database table by following reorganization pointers to access reorganization records and wherein old table scanners are constrained to ignore reorganization records when accessing records sequentially in a scan of the database table; and
d2) identifying table and index scanner processes commencing after the completion of the moving as new table scanners, wherein new table scanners are constrained to ignore reorganization pointers in accessing records in the database table.

32. The computer readable medium of claim 31 further comprising the steps of:
e) deleting the reorganization pointer records and removing the reorganization record flag from the records flagged after each query associated with an old table scanner is complete; and
f) repeating steps a–d after the completion of each query associated with a new scanner until the records in the database table meet a reorganization criteria.

33. The computer readable medium of claim 32 in which step f) alternates between moving records from a one of successively defined portions of the table and moving records in a predefined order into a one of the successively defined vacated portions of the table.

34. A computer readable medium containing program instructions for reorganizing a database table online, allowing the database table to be scanned, accessed and updated during the reorganization, the program instructions comprising the steps of:
a) a vacate move step that relocates a subset of records in a defined set of pages to available space within the database table using temporary pointers;
b) a vacate clean up step that removes the temporary pointers of the vacate move step;
c) a fill move step that moves selected records to the defined set of pages using temporary pointers; and
d) a fill clean up step that removes the temporary pointers of the fill move step, wherein each clean up step is synchronised to commence at the completion of a move step and to commence only when all queries launching scanner processes commenced before the completion of a move step have completed and each move step is synchronised to commence at the completion of a clean up step and to commence only when all queries launching scanner processes after the completion of a previous move step have completed.

35. The computer readable medium of claim 34 wherein step a) comprises:
ii) moving each data record in a defined set of pages to a new location in a page in the database table outside the defined set of pages;

ii) flagging each moved non-overflow data record as a reorganization record;

iii) creating a reorganization pointer record for each moved non-overflow data record at the initial location of the moved record, the reorganization pointer record pointing to the new location of the moved record;

iv) for each overflow pointer record located in the defined set of pages and associated with a moved overflow data record, creating a reorganization pointer record for the moved overflow data record at the location of the said reorganization pointer record and flagging the moved overflow record as a reorganization record; and v) flagging each overflow pointer record pointing to an overflow record outside the defined set of pages to be a reorganization pointer record, and flagging each of said overflow records as a reorganization record.

36. The computer readable medium of claim 35 wherein step b) comprises:

i) deleting reorganization pointers in the defined set of pages; and ii) removing the reorganization record flag from each reorganization record in the database table.

37. The computer readable medium of claim 36, wherein step c) comprises:

i) moving selected records to the defined set of pages such that the relative ordering of the selected records matches the predefined ordering constraint;

ii) flagging each moved record as a reorganization record;

iii) creating a reorganization pointer record for each moved non-overflow record at the initial location of the moved record, the reorganization pointer record pointing to the new location of the moved record; and iv) creating a reorganization pointer record for each moved overflow record at the location of the overflow pointer record for the moved record, the reorganization pointer record pointing to the new location of the moved record.

38. The computer readable medium of claim 37 wherein step d) comprises:

i) deleting reorganization pointers in the defined set of pages; and ii) removing the reorganization record flag from each reorganization record in the database table.

39. The computer readable medium of claim 38, wherein table scanner processes commencing during each move step are identified as old table scanners, wherein old table scanners are constrained to access records in the database table by following reorganization pointers to access reorganization records and are further constrained to access reorganization records sequentially by ignoring reorganization records and table scanner processes commencing after the completion of a move step are identified as new table scanners, wherein new table scanners ignore reorganization pointers in accessing records in the database table.

40. A computer system for reorganizing a database table online, allowing the database table to be scanned, accessed and updated during the reorganization, the computer system comprising means for moving a subset of records within the database table;

means for flagging each record moved by the means for moving a subset of records as a reorganization record;

means for creating a reorganization pointer record for each record moved by the means for moving a subset of records at the initial location of the moved record, the reorganization pointer record pointing to the new location of the moved record; and means for establishing scanner process constraints based on whether a scanner process is commenced prior to or after moving the subset of records, wherein the scanner process can correctly retrieve records from the database table during the reorganization of the database table, including before and after movement of records in the reorganization.

41. The computer system of claim 40 wherein the means for establishing scanner process constraints further comprises:

means for identifying table and index scanner processes commencing prior to moving the subset of records as old table scanners wherein old table scanners are constrained to access records in the database table by following reorganization pointers to access reorganization records and wherein old table scanners are constrained to ignore reorganization records when accessing records sequentially in a scan of the database table; and means for identifying table and index scanner processes commencing after the completion of moving the subset of records as new table scanners, wherein new table scanners are constrained to ignore reorganization pointers in accessing records in the database table.

42. The computer system of claim 41 further comprising:

means for deleting the reorganization pointer records and removing the reorganization record flag from the records by the means for flagging after each query associated with an old table scanner is complete; and means for moving another subset of records after the completion of each query associated with a new scanner until the records in the database table meet a reorganization criteria.

43. The computer system of claim 42 in which the means for moving another subset of records alternates between moving records from a one of successively defined portions of the table and moving records in a predefined order into a one of the successively defined vacated portions of the table.

44. A computer system for reorganizing a database table online, allowing the database table to be scanned, accessed and updated during the reorganization, the computer system comprising:

means for performing a vacate move step that relocates a subset of records in a defined set of pages to available space within the database table using temporary pointers;

means for performing a vacate clean up step that removes the temporary pointers of the vacate move step;

means for performing a fill move step that moves selected records to the defined set of pages using temporary pointers; and means for performing a fill clean up step that removes the temporary pointers of the fill move step, wherein each clean up step is synchronised to commence at the completion of a move step and to commence only when all queries launching scanner processes commenced before the completion of a move step have completed and each move step is synchronised to commence at the completion of a clean up step and to commence only when all queries launching scanner processes after the completion of a previous move step have completed.

45. The computer system of claim 44 wherein the means for performing the vacate move step comprises:

means for moving each data record in a defined set of pages to a new location in a page in the database table outside the defined set of pages;

means for flagging each moved non-overflow data record as a reorganization record;

means for creating a reorganization pointer record for each moved non-overflow data record at the initial location of the moved record, the reorganization pointer record pointing to the new location of the moved record;

means for each overflow pointer record located in the defined set of pages and associated with a moved overflow data record, creating a reorganization pointer record for the moved overflow data record at the location of the said reorganization pointer record and flagging the moved overflow record as a reorganization record; and means for flagging each overflow pointer record pointing to an overflow record outside the defined set of pages to be a reorganization pointer record, and flagging each of said overflow records as a reorganization record.

46. The computer system of claim 45 wherein the means for performing the vacate clean up step comprises:

means for deleting reorganization pointers in the defined set of pages; and means for removing the reorganization record flag from each reorganization record in the database table.

47. The computer system of claim 46 wherein the means for performing the fill move step comprises:

means for moving selected records to the defined set of pages such that the relative ordering of the selected records matches the predefined ordering constraint;

means for flagging each moved record as a reorganization record;

means for creating a reorganization pointer record for each moved non-overflow record at the initial location of the moved record, the reorganization pointer record pointing to the new location of the moved record; and means creating a reorganization pointer record for each moved overflow record at the location of the overflow pointer record for the moved record, the reorganization pointer record pointing to the new location of the moved record.

48. The computer system of claim 47 wherein the means for performing the fill clean up step comprises:

means for deleting reorganization pointers in the defined set of pages; and means for removing the reorganization record flag from each reorganization record in the database table.

49. The computer system of claim 48 further comprising:

means for identifying table scanner processes commencing during the performance of each move step as old table scanners, wherein old table scanners are constrained to access records in the database table by following reorganization pointers to access reorganization records and are further constrained to access reorganization records sequentially by ignoring reorganization records; and means for identifying table scanner processes commencing after the completion of the performance of a move step as new table scanners, wherein new table scanners ignore reorganization pointers in accessing records in the database table.

* * * * *

UNITED STATES PATENT AND TRADEMARK OFFICE
CERTIFICATE OF CORRECTION

PATENT NO. : 6,950,834 B2
DATED : September 27, 2005
INVENTOR(S) : Matthew A. Huras et al.

It is certified that error appears in the above-identified patent and that said Letters Patent is hereby corrected as shown below:

Column 14,
Line 63, delete "RD" and replace with -- RID --.

Column 19,
Line 1, delete "1," and replace with -- 20, --.

Signed and Sealed this

Fourteenth Day of March, 2006

JON W. DUDAS
*Director of the United States Patent and Trademark Office*